(12) United States Patent
Hsu et al.

(10) Patent No.: US 8,427,829 B2
(45) Date of Patent: Apr. 23, 2013

(54) DUAL DIRECTIONAL SLIDING HINGE AND PORTABLE DEVICE

(75) Inventors: Chia-Hao Hsu, New Taipei (TW); Yu-Feng Lin, New Taipei (TW); Chung-Lin Lee, New Taipai (TW); Ming-Wei Liao, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 244 days.

(21) Appl. No.: 13/102,102

(22) Filed: May 6, 2011

(65) Prior Publication Data
US 2012/0280603 A1 Nov. 8, 2012

(51) Int. Cl.
- *G06F 1/16* (2006.01)
- *H05K 5/00* (2006.01)
- *H05K 7/00* (2006.01)
- *E05D 11/10* (2006.01)
- *H04M 1/00* (2006.01)

(52) U.S. Cl.
USPC ............... 361/679.56; 455/575.4; 16/327

(58) Field of Classification Search ............ 361/679.55, 361/679.56; 455/575.1, 575.4; 16/319, 327–332, 16/347, 357, 364
See application file for complete search history.

(56) References Cited

U.S. PATENT DOCUMENTS

| | | | | |
|---|---|---|---|---|
| 6,707,664 | B2* | 3/2004 | Murphy | 361/679.16 |
| 7,512,427 | B2* | 3/2009 | Finke-Anlauff et al. | 455/575.1 |
| 8,126,520 | B2* | 2/2012 | Bestle et al. | 455/575.4 |
| 2003/0157957 | A1* | 8/2003 | Wendorff et al. | 455/550 |
| 2003/0202656 | A1* | 10/2003 | Ikeuchi et al. | 379/419 |
| 2007/0080950 | A1* | 4/2007 | Lee et al. | 345/169 |
| 2007/0136405 | A1* | 6/2007 | Weinstein et al. | 708/130 |
| 2008/0051161 | A1* | 2/2008 | Tashiro | 455/575.1 |
| 2008/0186663 | A1* | 8/2008 | Chen | 361/681 |
| 2009/0005135 | A1* | 1/2009 | Lindgren et al. | 455/575.4 |
| 2009/0036180 | A1* | 2/2009 | Ye | 455/575.4 |
| 2010/0016042 | A1* | 1/2010 | Shim et al. | 455/575.4 |
| 2011/0096480 | A1* | 4/2011 | Seo et al. | 361/679.01 |
| 2011/0275422 | A1* | 11/2011 | Kemppinen | 455/575.4 |

* cited by examiner

*Primary Examiner* — Adrian S Wilson
(74) *Attorney, Agent, or Firm* — Alan Kamrath; Kamrath IP Lawfirm, P.A.

(57) ABSTRACT

A dual directional sliding hinge is mounted in a portable device with a cover, a first base and a second base and has a main panel, a first sliding unit, a second sliding unit. The main panel is attached to the cover. The first sliding unit is attached to the first base. The second sliding unit is attached to the second base. When the first and second sliding units slide at the closing position, the cover and the first and second bases are folded to have a smallest volume. Since the first and second sliding units have different sliding distances when sliding to different directions, the functioning units on the first and second bases are revealed alternatively. Therefore, the user can decide to use different functioning units as desired.

20 Claims, 14 Drawing Sheets

DUAL DIRECTIONAL SLIDING HINGE AND PORTABLE DEVICE

BACKGROUND OF THE INVENTION

1. Field of the Invention

The present invention relates to dual directional sliding hinge, especially to a sliding hinge mounted in a portable device to allow two casings of the portable device to slide relative each other.

2. Description of the Prior Arts

With the touch panel being widely used, the design for the portable devices are varied as well. For example, the conventional tilting-type cell phone has a touch panel on the outer surface of the cover, or the sliding-type cell phone has a touch panel and a sliding keyboard, or the cell phone only has the touch panel to be used as the input and/or output interfaces. However, the portable devices need to provide more and more functions as the progress of the technology. Using the touch panel is not enough to provide the multiple functions. Therefore, to present more functions at a limit volume of the portable device becomes an important issue.

To overcome the shortcomings, the present invention provides a dual directional sliding hinge to mitigate or obviate the aforementioned problems.

SUMMARY OF THE INVENTION

The main objective of the present invention is to provide a sliding hinge with dual directional sliding path and having smallest volume when folded. The dual directional sliding hinge is mounted in a portable device with a cover, a first base and a second base and has a main panel, a first sliding unit, a second sliding unit. The main panel is attached to the cover. The first sliding unit is attached to the first base. The second sliding unit is attached to the second base. When the first and second sliding units slide at the closing position, the cover and the first and second bases are folded to have a smallest volume. Since the first and second sliding units have different sliding distances when sliding to different directions, the functioning units on the first and second bases are revealed alternatively. Therefore, the user can decide to use different functioning units as desired.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 4, a dual directional sliding hinge comprises a main panel 10, a first sliding unit 20, a second sliding unit 30 and a connecting unit 40.

The main panel 10 has a surface 101. In a preferred embodiment, the main panel 10 has at least one actuating unit and an auxiliary frame 100. Each actuating unit has a closing point, a first end and a second end. The closing point is located between the first and the second ends. In a preferred embodiment, each actuating unit has a main channel 11 and a resilient member 12. The main channel 11 is formed through the main panel 10. The main channel 11 has a first slot 111 and a second slot 112 connecting to each other and including an angle θ. A connecting part 113 is formed between the first and second slots 111, 112. The closing point of the actuating unit is formed at the connecting part 113. The first end of the actuating unit is formed at the end 111a of the first slot 111. The second end of the actuating unit is formed at the end 112a of the second slot 112. The slots 111, 112 may be tilt to different direction to bend the connecting part 113. The resilient member 12 is formed on the surface 101 of the main panel 10 and is adjacent to the main channel 11. The resilient member 12 may be integrated on the main panel 10 by cutting two parallel slits on the main panel 10 to form the resilient member 12 between the slits. A positioning point 121 is formed on a central part of the resilient member 12. The positioning point 121 may be a protrusion protruding out the surface 101 of the main panel 10 or a recess formed in the surface 101 of the main panel 10. The auxiliary frame 100 is mounted securely around the main panel 10 and has two auxiliary channels 102 formed on two sides of the auxiliary frame 100. The auxiliary channels 102 are respectively located at two side edges of the main panel 10.

The first sliding unit 20 is mounted slidably on the main panel 10 and is connected to the actuating unit. In a preferred embodiment, the first sliding unit 20 has a sliding frame 21. The sliding frame 21 is stepped and has a linking part 211, a receiving part 212 and a bending part 213. The bending part 213 is formed between the linking part 211 and the receiving part 212. The linking part 211 has two hooking parts 211a formed respectively on two side edges of the linking part 211, each hooking parts 211s is and slidably mounted on the side edges of the main panel 10 and located in the auxiliary channels 102 so as to stabilize the sliding path of the first sliding unit 20 relating to the main panel 10. Furthermore, the hooking part 211a may engage the auxiliary channel 102 of the auxiliary frame 100 to limit the sliding path of the first sliding unit 20 relating to the main panel 10. The receiving part 212 has two hooking parts 212a formed respectively on two side edges of the receiving part 212 and slidably clamping the two side edges of the second sliding unit 30. The sliding frame 21 further has at least one sliding groove 214 and at least one positioning segment 215. The sliding groove 214 may be formed on the linking part 211. The positioning segment 215 may be a recess or a protrusion to selectively engage the positioning point 121 of the resilient member 12 to provide positioning function.

The second sliding unit 30 is mounted slidably on the main panel 10 and is connected to the actuating unit. In a preferred embodiment, the second sliding unit 30 is a connecting frame 31. The connecting frame 31 is mounted slidably between the hooking parts 212a of the receiving part 212 of the sliding frame 21. The connecting frame 31 has at least one pivoting slot 311 formed on an end of the connecting frame 31 and corresponding to the linking part 211 of the first sliding unit 20.

The connecting unit 40 is pivoted respectively to the first and second sliding units 20, 30 and is mounted slidably on the actuating unit of the main panel 10 to connect the actuating unit with the first and second sliding units 20, 30. In a preferred embodiment, the connecting unit 40 has at least one connecting arm 41. Each connecting arm 41 has a pivoting protrusion 411, a sliding protrusion 412 and a linking protrusion 413 formed separately thereon. The pivoting protrusion 411 of the connecting arm 41 is pivoted on the first sliding unit 20. The sliding protrusion 412 is mounted slidably through the first sliding unit 20 and is mounted slidably in the main channel 11 of the main panel 10. The linking protrusion 413 is pivoted slidably on the second sliding unit 30. In a preferred embodiment, the pivoting protrusion 411 is pivoted on the linking part 211 of the sliding frame 21. The sliding protrusion 412 is mounted slidably through the sliding groove 214 of the sliding frame 21. The linking protrusion 413 is pivoted slidably in the pivoting slot 311 of the linking frame 31.

In a preferred embodiment, the main panel 10 has two actuating units formed symmetrically. The sliding frame 21 has two sliding grooves 214 respectively corresponding to the actuating units. The linking frame 31 has two pivoting slots 311 respectively corresponding to the actuating units. The connecting unit 40 has two connecting arms 41 respectively corresponding to the actuating units.

When the first and second sliding units 20, 30 are located at the closing position, the first and second sliding units 20, 30 units have a maximum overlapping area. When the first and second sliding units 20, 30 slide symmetrically to the first direction AA from the closing position, the overlapping area between the first and second sliding units 20, 30 is reduced, and the sliding distance to the first direction AA of the first sliding unit 20 is larger than the sliding distance to the first direction AA of the second sliding unit 30. When the first and second sliding units 20, 30 slide symmetrically to the second direction BB from the closing position, the overlapping area between the first and second sliding units 20, 30 is reduced, and the sliding distance to the second direction BB of the first sliding unit 20 is smaller than the sliding distance to the second direction BB of the second sliding unit 30.

Further, the connecting unit 40 slides the first and second sliding units 20, 30 symmetrically. When the first and second sliding units 20, 30 are located at the closing position, the connecting unit 40 is located at the closing point of the actuating unit of the main panel 10. When the first and second units 20, 30 is pushed symmetrically to the first direction AA from the closing position, the connecting unit 40 slides to the first end 111a of the actuating unit of the main panel 10. When the first and second units 20, 30 is slid symmetrically to the second direction BB from the closing position, the connecting unit 40 slides to the second end 112a of the actuating unit of the main panel 10.

Figure 1:
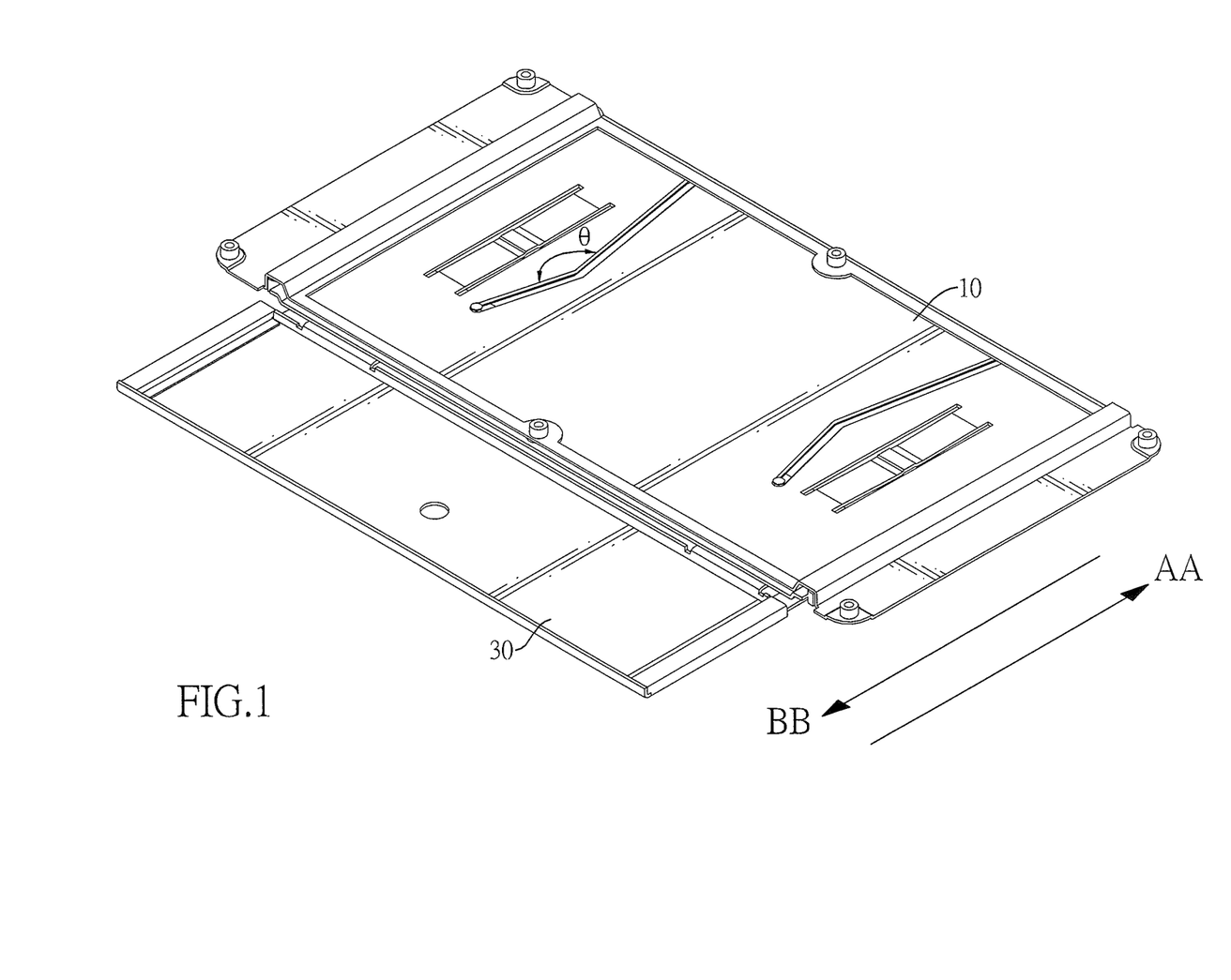
FIG. 1 is a perspective view of a dual directional sliding hinge in accordance with the present invention.
Figure 2:
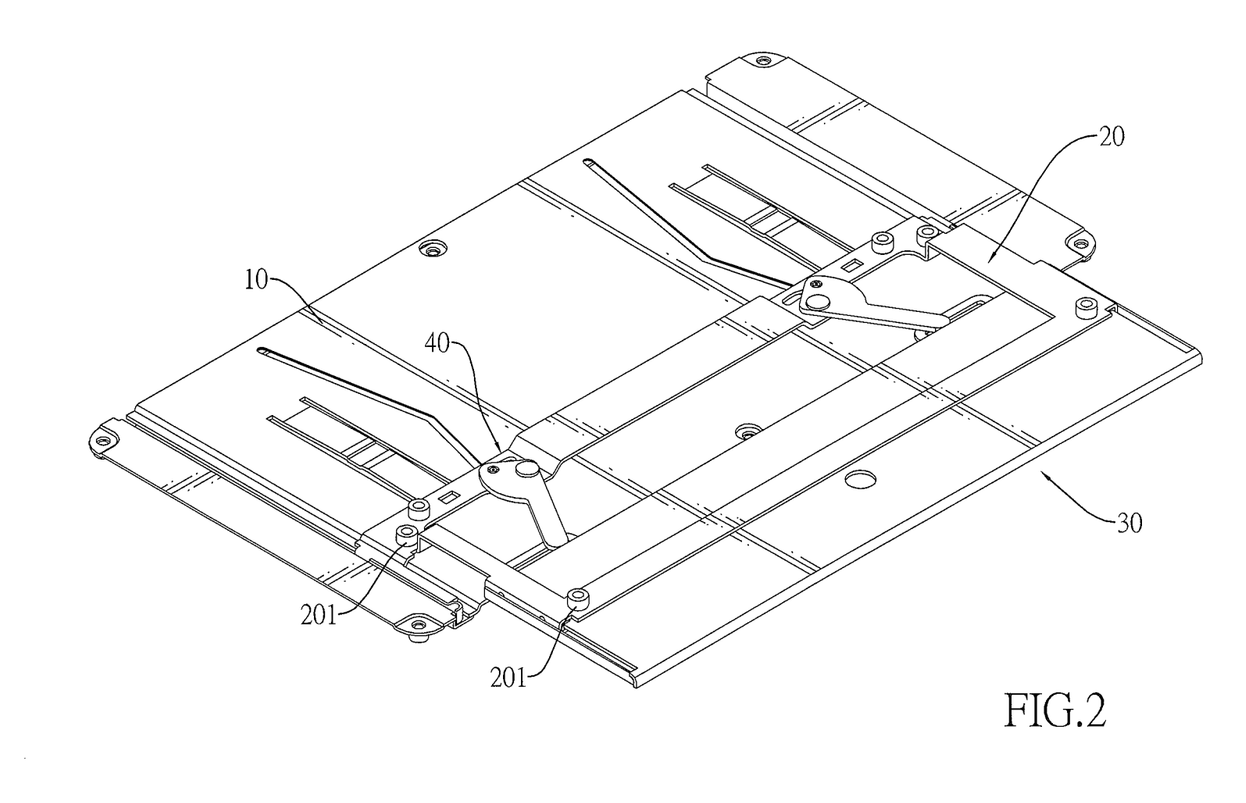
FIG. 2 is another perspective view of the dual directional sliding hinge in FIG. 1.
Figure 3:
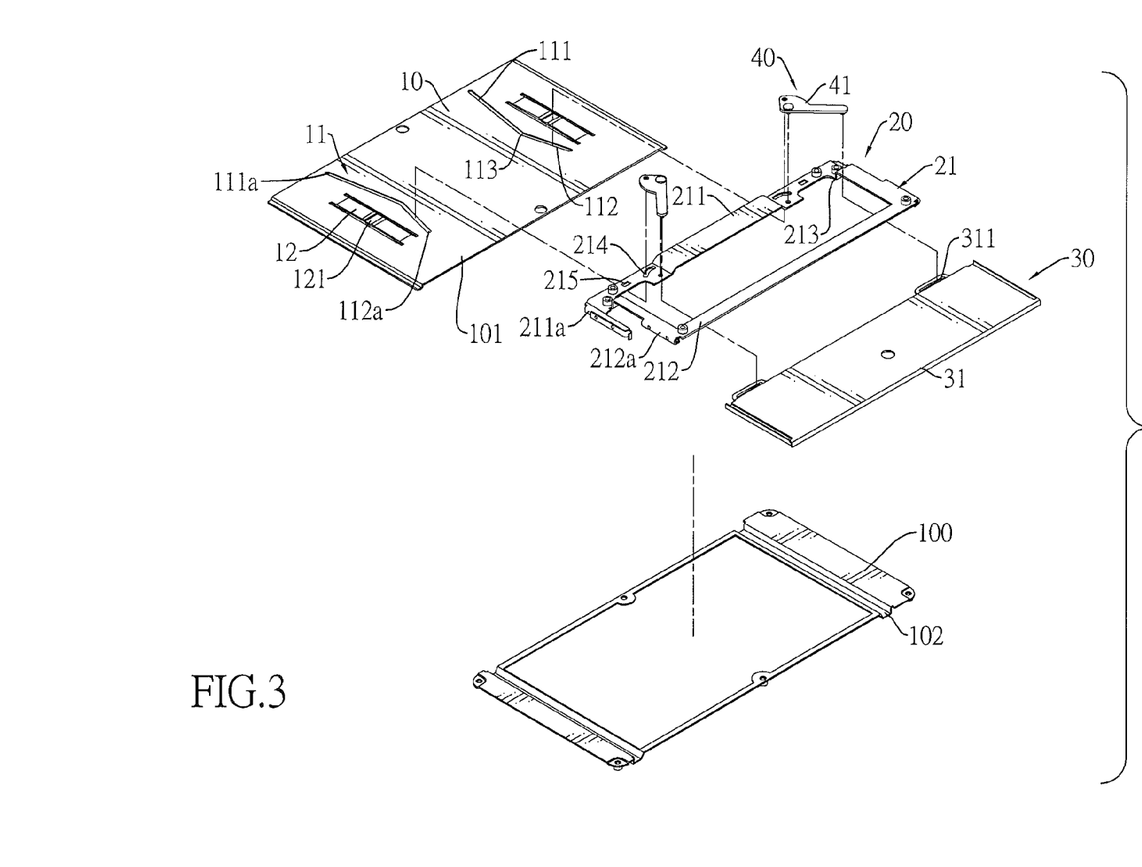
FIG. 3 is an exploded perspective view of the dual directional sliding hinge in FIG. 1.
Figure 4:
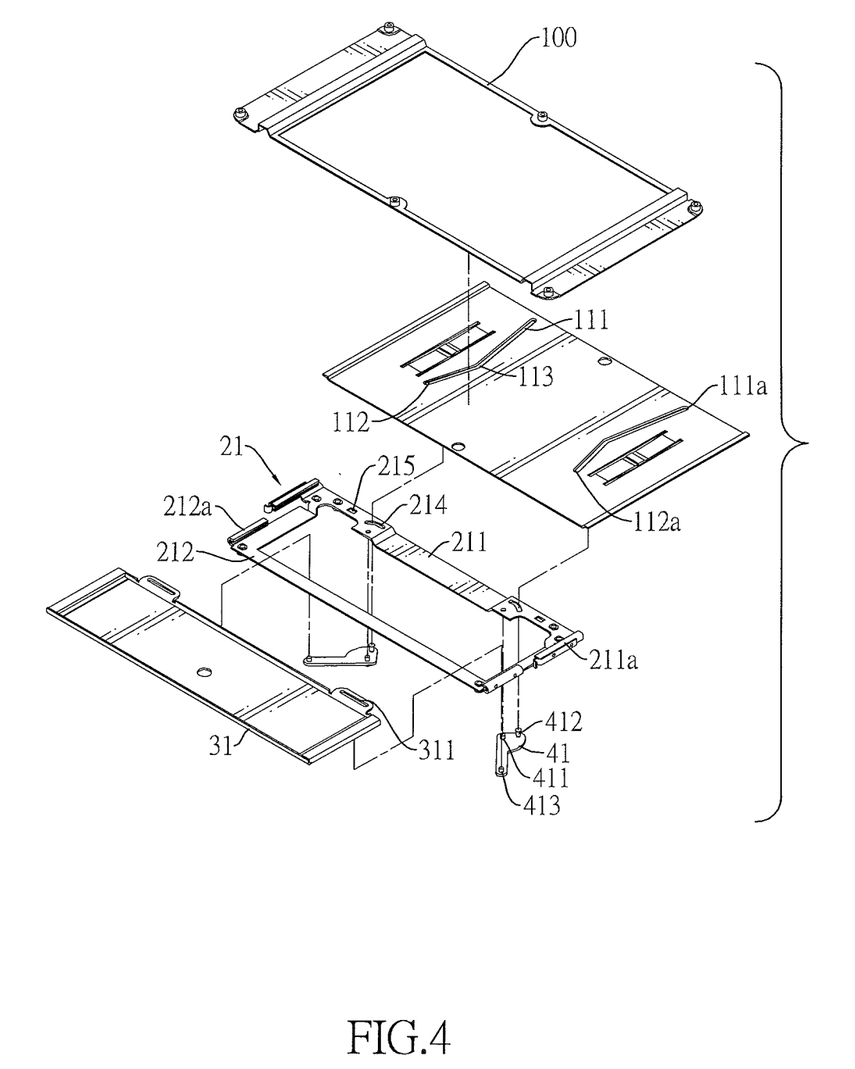
FIG. 4 is another exploded perspective view of the dual directional sliding hinge in FIG. 1.
Figure 5:
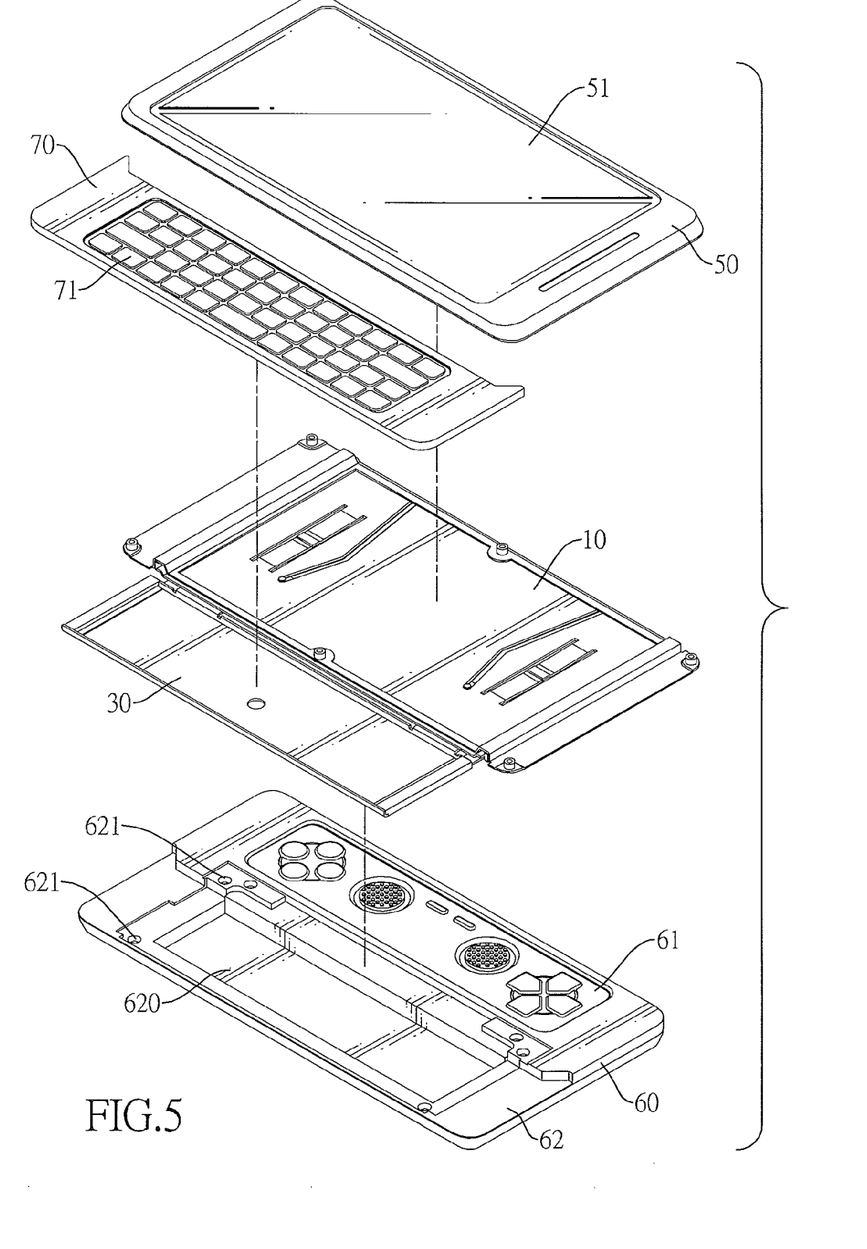
FIG. 5 is an exploded perspective view of a portable device in accordance with the present invention.

With reference to FIGS. 3 to 5, a portable device in accordance with the present invention comprises the dual directional sliding hinge as described, a cover 50, a first base 60 and a second base 70. The cover 50 is attached securely to the main panel 10 and has a display panel 51 mounted thereon. The display panel 51 may be a touch panel. The first base 60 is attached securely to the first sliding unit 20 and has the same area with the cover 50. In a preferred embodiment, the first base 60 has a first functioning unit 61 and a stepped surface 62. The first functioning unit 61 is formed on a half of the first base 60 corresponding to the first direction AA. The stepped surface 62 is formed on the other half of the first base 60 and has a mounting recess 620 formed thereon corresponding to the second direction BB. The mounting recess 620 has multiple fastening holes 621 formed on peripheral thereof. The first sliding unit 20 has multiple fastening pins 201 (as shown in FIG. 2) to attach the first sliding unit 20 securely to the first base 60. The first functioning unit 61 may be an input device or an output device. In a preferred embodiment, the first functioning unit 61 is a gaming keyboard. The second base 70 is attached securely to the second sliding unit 30 and has a second functioning unit 71. The second functioning unit 71 may be an input device or an output device. In a preferred embodiment, the second functioning unit 71 is a main keyboard. Since the first base 60 has the stepped surface 62, the second base 70 is received on the stepped surface 62 of the first base 60. Moreover, because the second base 70 is attached securely to the second sliding unit 30, the second base 70 is also revealed when the second sliding unit 30 is slid to the second direction BB.

Figure 6:
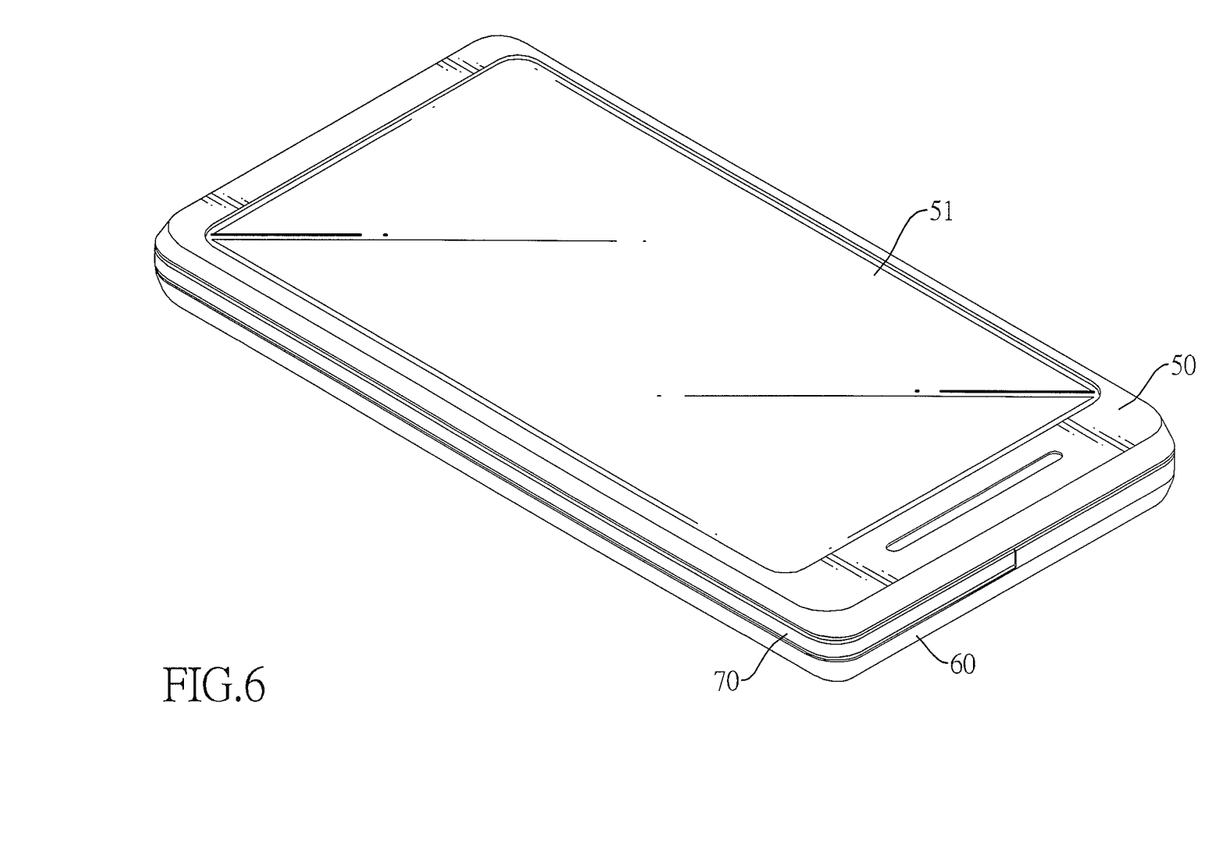
FIG. 6 is an operational perspective view of the portable device in FIG. 5, shown closed.
Figure 7:
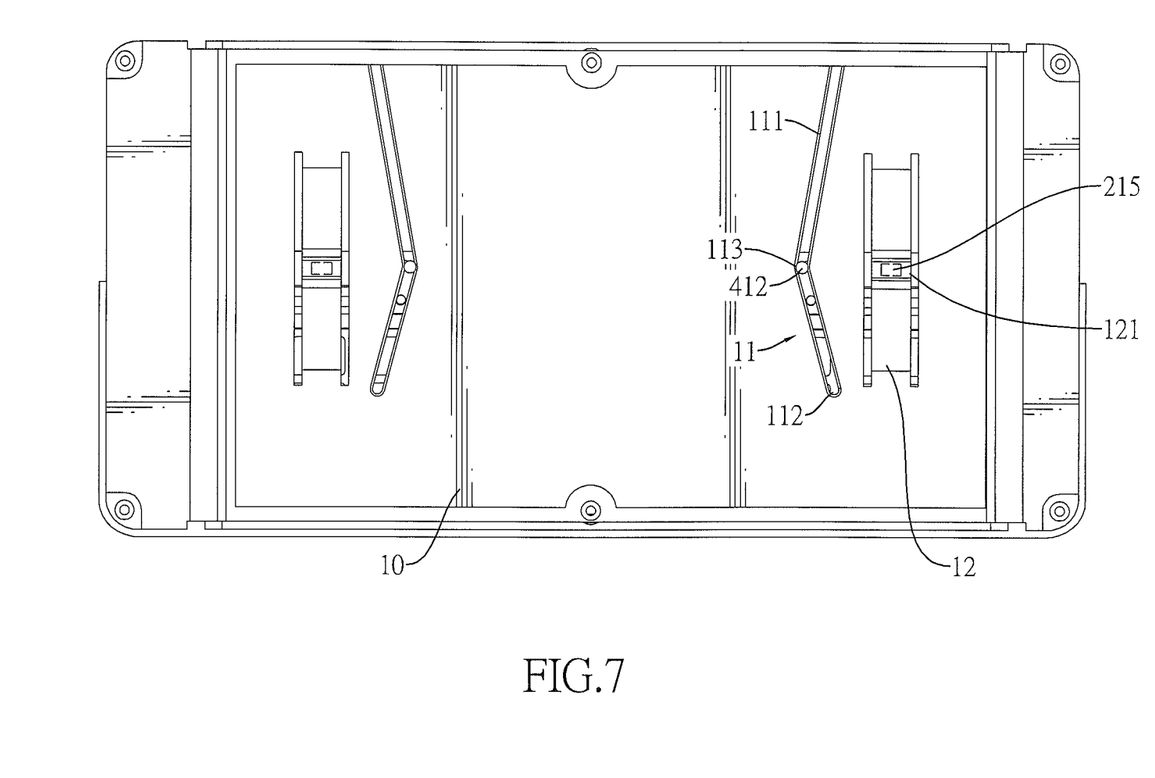
FIG. 7 is an operational top view of the portable device in FIG. 5, shown closed.
Figure 8:
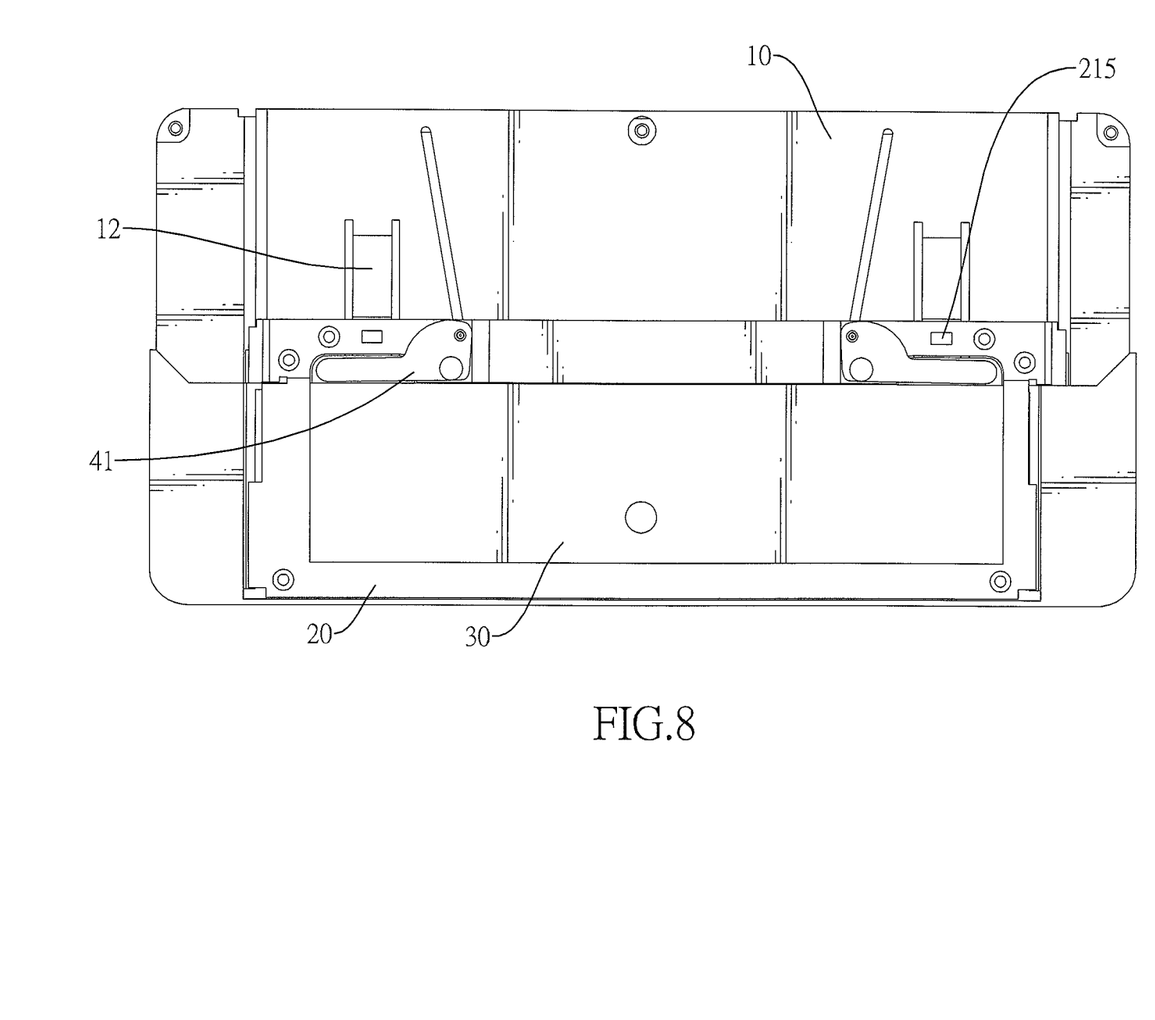
FIG. 8 is an operational bottom view of the portable device in FIG. 5, shown closed.

With reference to FIGS. 6 to 8, when the portable device is closed, the cover 50, the first base 60 and the second base 70 are closed to occupy minimum volume. The first and second sliding units 20, 30 are located at closing position. The sliding protrusion 412 of the connecting arm 41 are located at the connecting part 113 of the main channel. The positioning segment 215 engages the positioning point 121 of the resilient member 12 to position the main panel 10 and the first and second sliding units 20, 30 at the closing position. Therefore, the cover 50, the first base 60 and the second base 70 are also secured at the closing position and are kept from opening accidentally.

Figure 9:
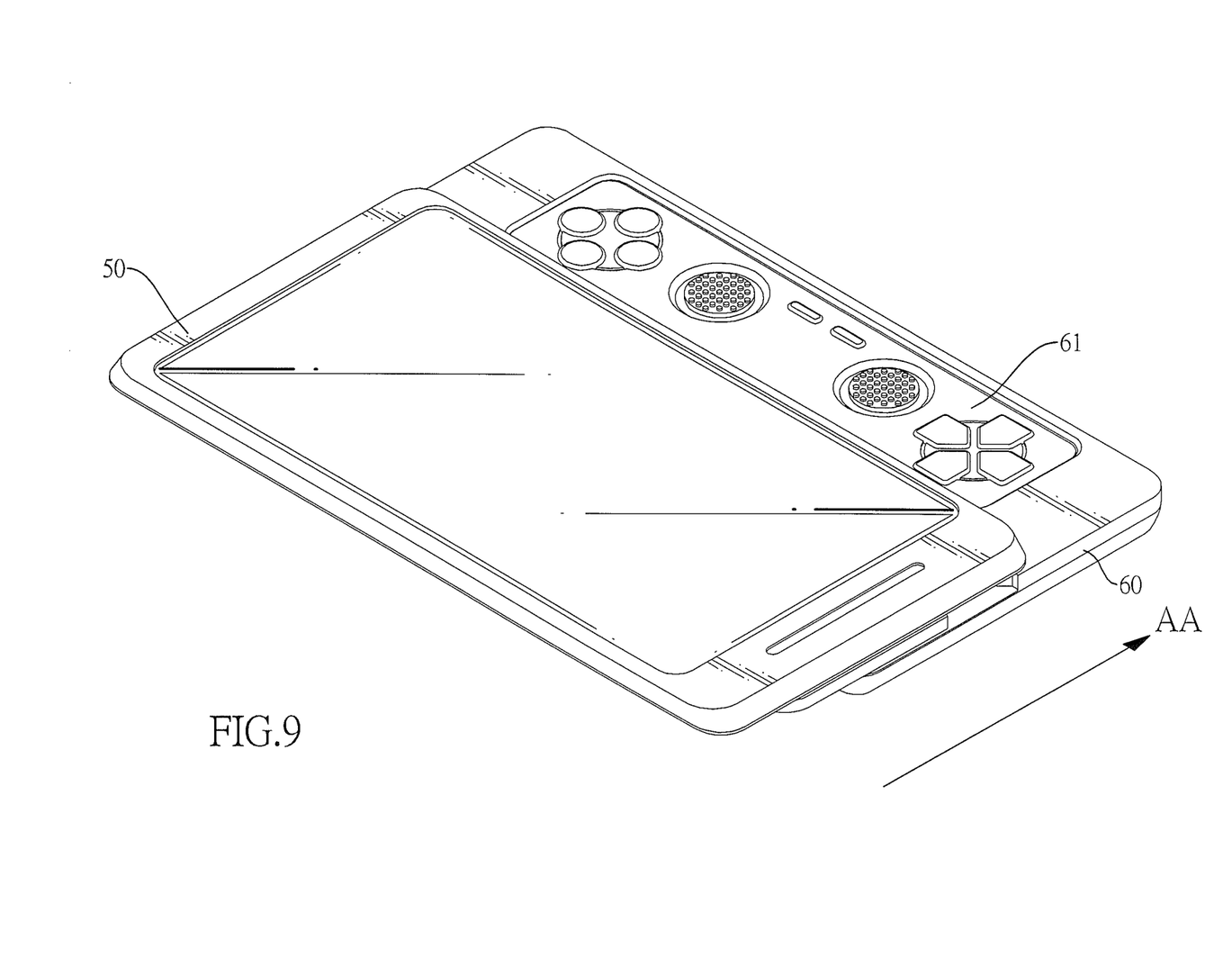
FIG. 9 is an operational perspective view of the portable device in FIG. 5, shown opened to the first direction.
Figure 10:
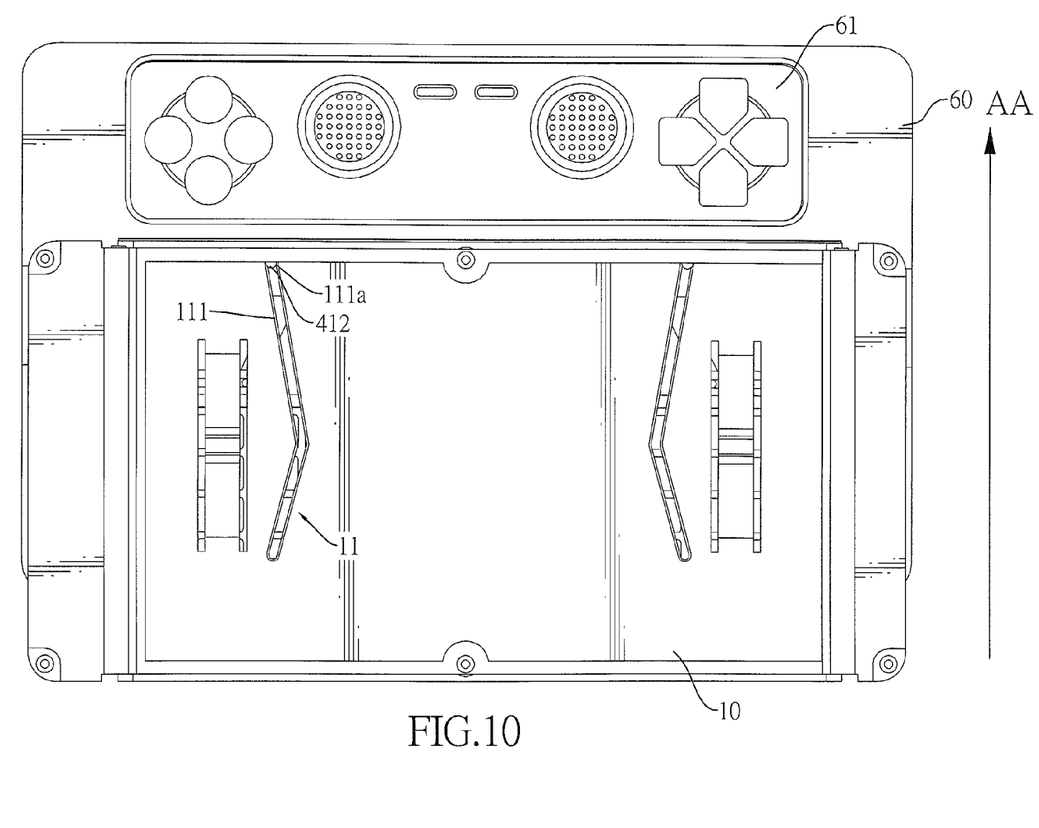
FIG. 10 is an operational top view of the portable device in FIG. 5, shown opened to the first direction.
Figure 11:
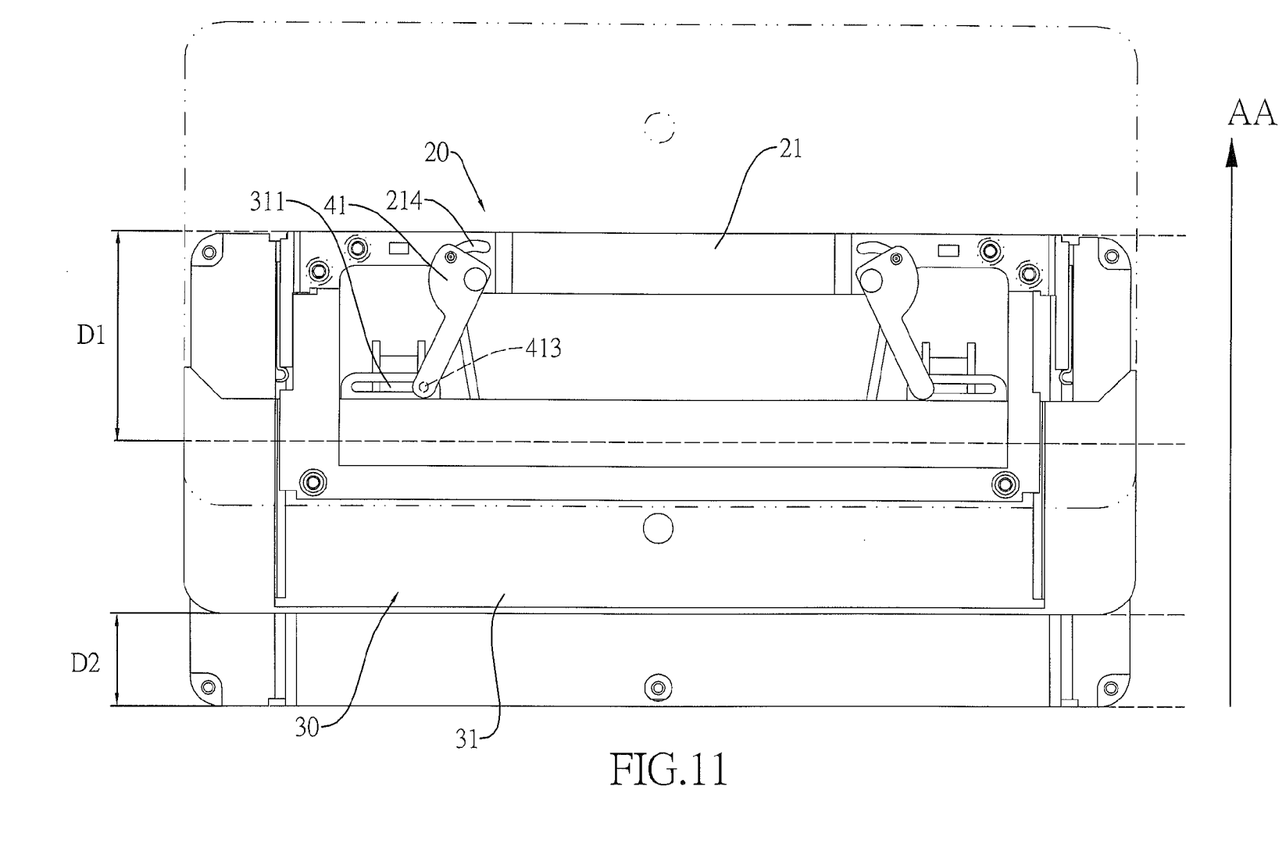
FIG. 11 is an operational bottom view of the portable device in FIG. 5, shown opened to the first direction.

With reference to FIGS. 9 to 11, when the cover 50 is stopped and the first base 60 is slid to the first direction AA to open, the first and second sliding units 20, 30 are slid symmetrically to the first direction AA. Then the first functioning unit 61 of the first base 60 is pushed to reveal relative to the cover 50. The sliding protrusion 412 slides in the first slot 111 of the main channel 11. The linking protrusion 413 slides in the pivoting slot 311 of the connecting frame 31. The sliding protrusion 412 slides in the sliding groove 214 of the sliding frame 21. When the sliding protrusion 412 abuts the end 111a of the first slot 111, the first functioning unit 61 of the first base 60 is fully revealed relative to the cover 50. The connecting arm 41 is pivoted at an angle to make the first and second sliding units 20, 30 have different sliding distances. Specifically, the first sliding unit 20 has a first sliding distance D1 from the closing position to the first direction AA. The second sliding unit 30 has a second sliding distance D2 from the closing position to the first direction AA. The first distance D1 is larger than the second distance D2.

Figure 12:
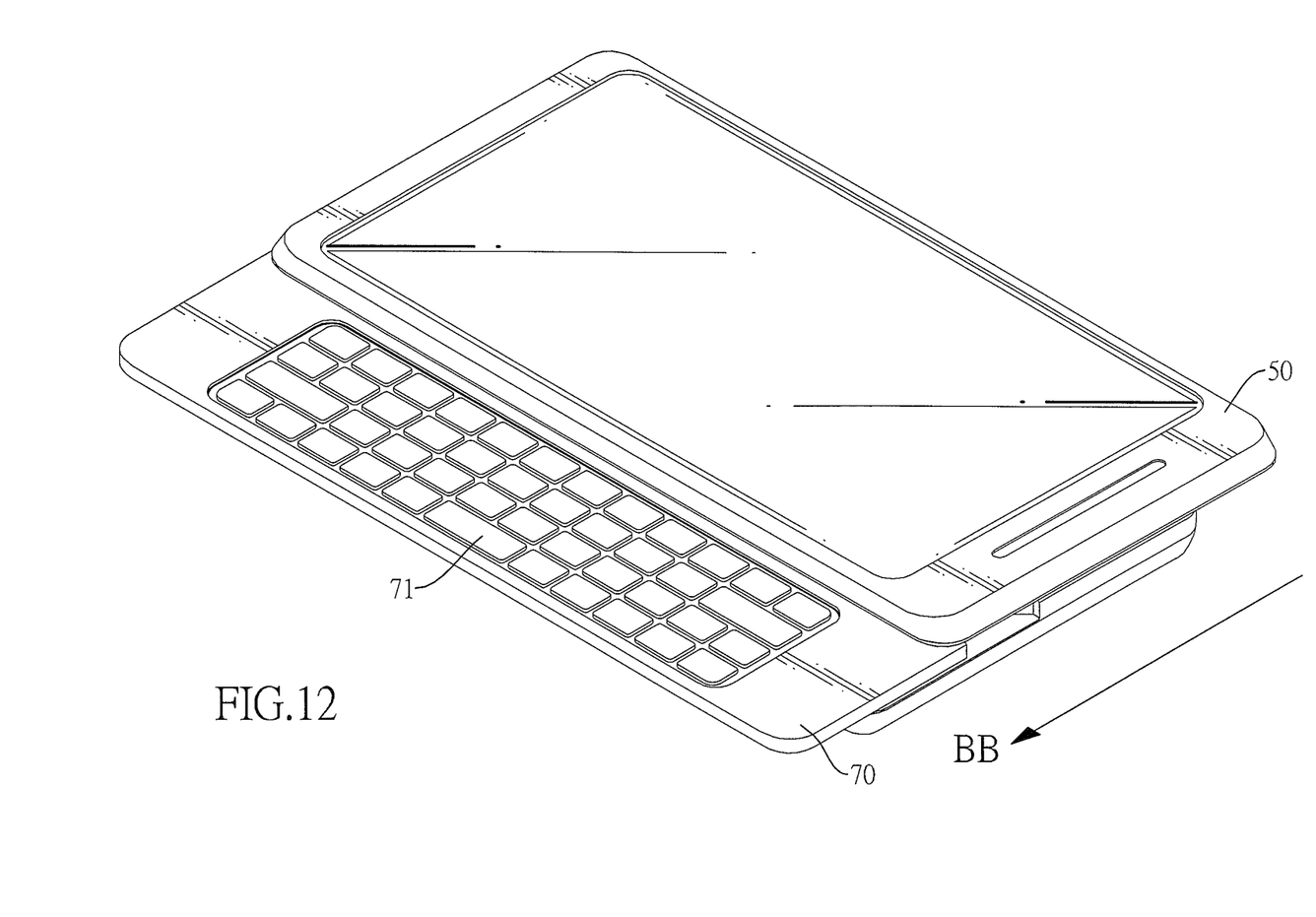
FIG. 12 is an operational perspective view of the portable device in FIG. 5, shown opened to the second direction.
Figure 13:
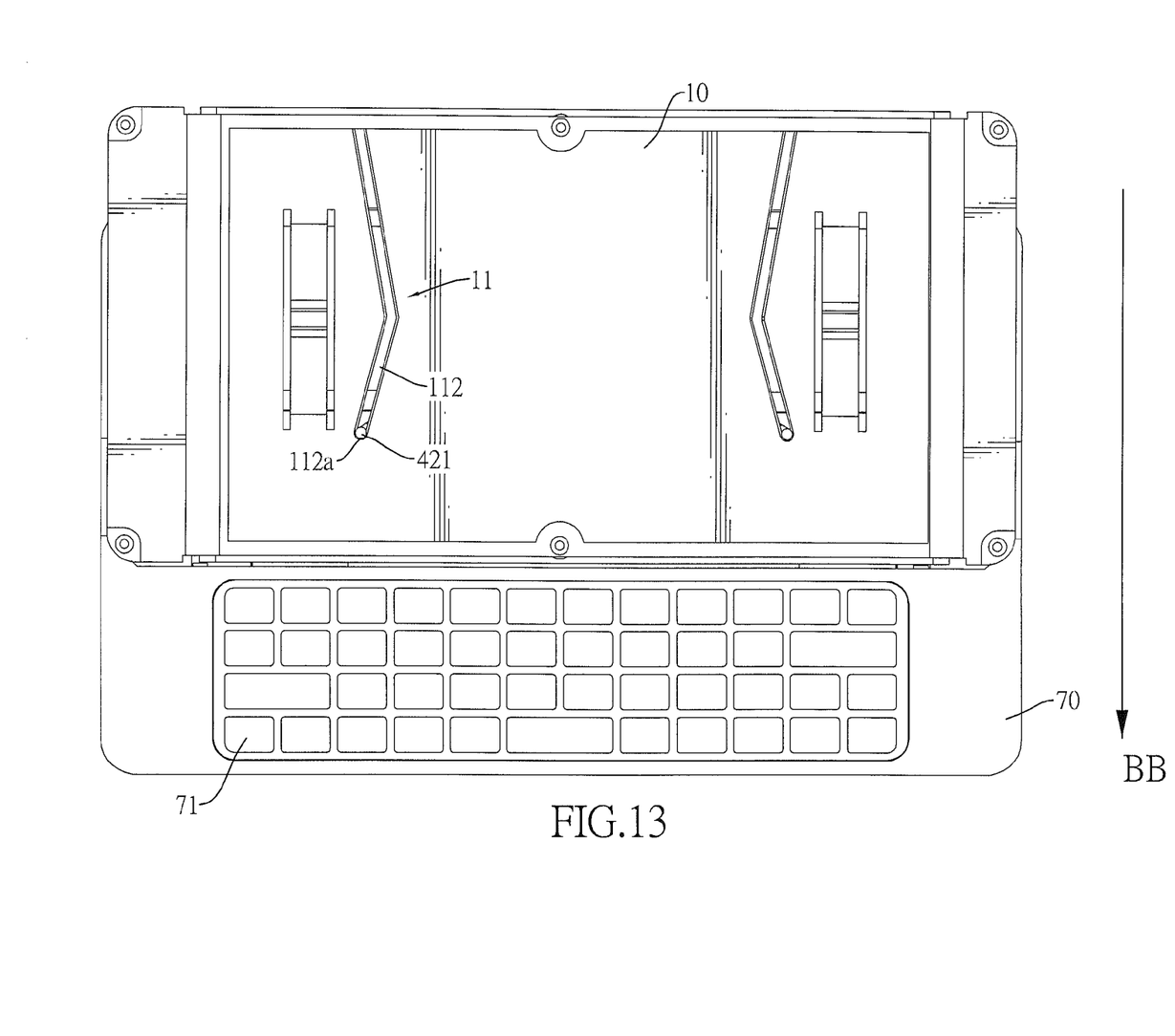
FIG. 13 is an operational top view of the portable device in FIG. 5, shown opened to the second direction.
Figure 14:
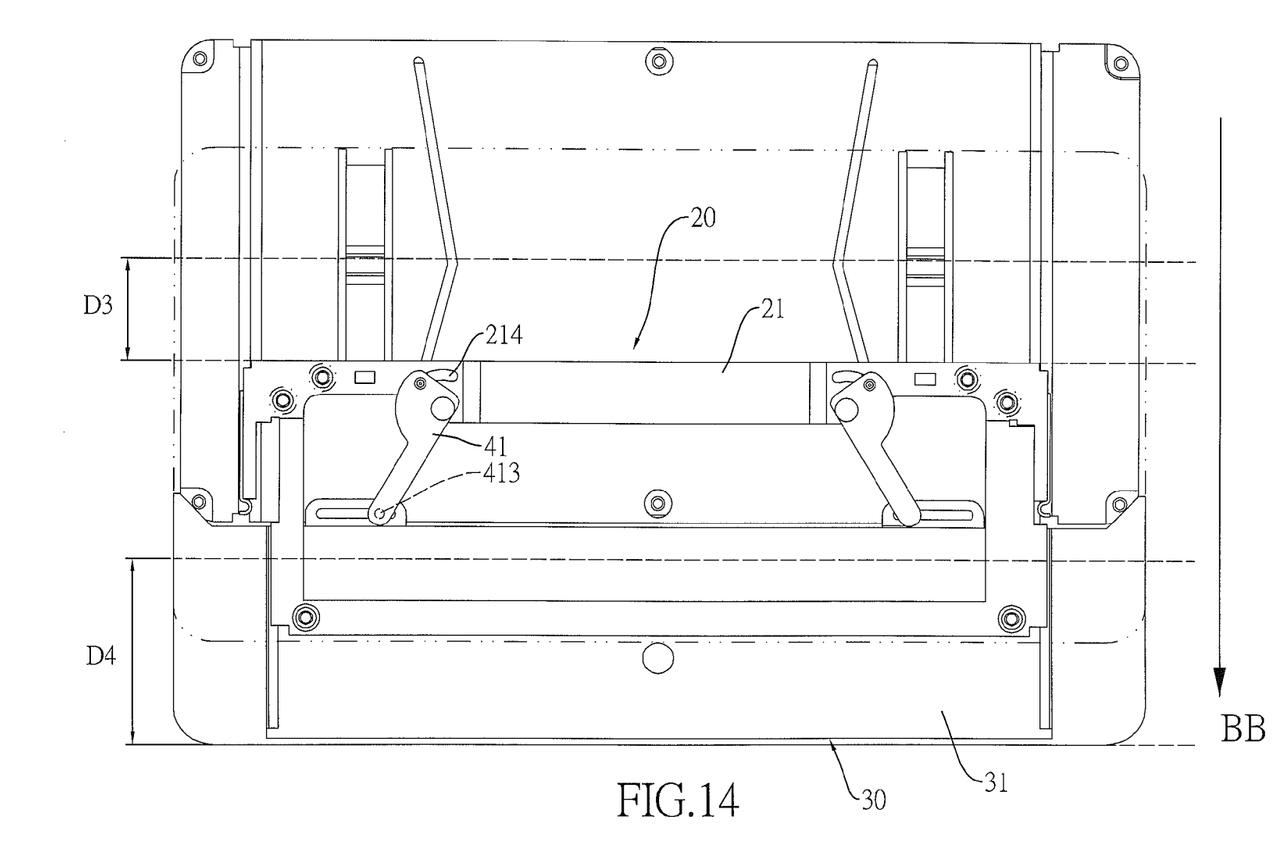
FIG. 14 is an operational bottom view of the portable device in FIG. 5, shown opened to the second direction.

With reference to FIGS. 12 to 14, when the cover 50 is stopped and the first base 60 is slid to the second direction BB to open, the first and second sliding units 20, 30 are slid symmetrically to the second direction BB. Then the second functioning unit 71 of the second base 70 is pushed to reveal relative to the cover 50. The sliding protrusion 412 slides in the second slot 112 of the main channel 11. The linking protrusion 413 slides in the pivoting slot 311 of the connecting frame 31. The sliding protrusion 412 slides in the sliding groove 214 of the sliding frame 21. When the sliding protrusion 412 abuts the end 112a of the second slot 112, the second functioning unit 71 of the second base 70 is fully revealed relative to the cover 50. The connecting arm 41 is pivoted at an angle to make the first and second sliding units 20, 30 have different sliding distances. Specifically, the first sliding unit 20 has a third sliding distance D3 from the closing position to the second direction BB. The second sliding unit 30 has a fourth sliding distance D4 from the closing position to the second direction BB. The third distance D3 is smaller than the fourth distance D4.

Consequently, the first and second sliding units 20, 30 have different sliding distance toward different directions to allow the first and second bases 60, 70 to be pushed out to use respectively at different direction so that the user can decide to use different functioning units as desired. The first and second bases 60, 70 can provide more area to accommodate more functioning units. Moreover, when the cover 50 and the first and second bases 60, 70 are folded, the portable device as described has smallest volume for easily stowing.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual directional sliding hinge comprising:
   a main panel;
   a first sliding unit mounted slidably on the main panel; and
   a second sliding unit mounted slidably on the main panel,
   wherein when the first and second sliding units are located at a closing position, the first and second sliding units have a maximum overlapping area,
   wherein when the first and second sliding units slide symmetrically to a first direction from the closing position, the overlapping area between the first and second sliding units is reduced, and a sliding distance to the first direction of the first sliding unit is larger than a sliding distance to the first direction of the second sliding unit, and
   wherein when the first and second sliding units slide symmetrically to a second direction from the closing position, the overlapping area between the first and second sliding units is reduced, and a sliding distance to the second direction of the first sliding unit is smaller than a sliding distance to the second direction of the second sliding unit.

2. The dual directional sliding hinge as claimed in claim 1 further comprising a connecting unit, wherein
   the main panel has at least one actuating unit, and each one of the at least one actuating unit has a first end, a second end a closing point formed between the first and second ends;
   the connecting unit is pivoted respectively to and slides the first and second sliding units and is mounted slidably on the at least one actuating unit of the main panel,
   wherein when the first and second sliding units are located at the closing position, the connecting unit is located at the closing point of the at least one actuating unit of the main panel,
   wherein when the first and second units is slid symmetrically to the first direction from the closing position, the connecting unit slides to the first end of the at least one actuating unit of the main panel, and
   wherein when the first and second units is slid symmetrically to the second direction from the closing position, the connecting unit slides to the second end of the at least one actuating unit of the main panel.

3. The dual directional sliding hinge as claimed in claim 2, wherein
   each one of the at least one actuating unit has a main channel; and
   the connecting unit comprises at least one connecting arm, and each one of the at least one connecting arm has
      a pivoting protrusion pivoted to the first sliding unit;
      a sliding protrusion mounted slidably through the first sliding unit and mounted slidably on a corresponding main channel of the main panel; and
      a linking protrusion pivoted slidably through the second sliding unit.

4. The dual directional sliding hinge as claimed in claim 3, wherein
   the first sliding unit has a sliding frame having at least one sliding groove formed therethrough;
   the second sliding unit has a connecting frame having at least one pivoting slot formed on an end of the connecting frame;
   the sliding protrusion of each one of the at least one pivoting arm is mounted slidably through a corresponding sliding groove of the sliding frame; and
   the linking protrusion of each one of the at least one pivoting arm is pivoted slidably through a corresponding pivoting slot of the connecting frame.

5. The dual directional sliding hinge as claimed in claim 4, wherein
   the sliding frame is stepped and has a linking part, a receiving part and a bending part formed between the linking part and the receiving part;
   the at least one sliding groove is formed on the linking part;
   the connecting frame is mounted slidably on the receiving part of the sliding frame; and
   the pivoting protrusion of each one of the at least one pivoting arm is pivoted on the linking part of the sliding frame.

6. The dual directional sliding hinge as claimed in claim 3, wherein
   the main channel of each one of the at least one actuating unit has a first slot and a second slot connecting to each other via a connecting part;
   the closing part of each one of the at least one actuating unit is formed at the connecting part;
   the first end of each one of the at least one actuating unit is formed at an end of the first slot; and
   the second end of each one of the at least one actuating unit is formed at an end of the second slot.

7. The dual directional sliding hinge as claimed in claim 2, wherein
   each one of the at least one actuating unit of the main panel has a resilient member having a positioning point formed on a central part of the resilient member; and
   the first sliding unit has at least one positioning segment selectively engaging the positioning point of the resilient member of each one of the at least one actuating unit.

8. The dual directional sliding hinge as claimed in claim 7, wherein
   the positioning point of the resilient member is a protrusion; and
   the positioning segment of the first sliding unit is a recess.

9. The dual directional sliding hinge as claimed in claim 7, wherein
   the positioning point of the resilient member is a recess; and
   the positioning segment of the first sliding unit is a protrusion.

10. The dual directional sliding hinge as claimed in claim 4, wherein
   each one of the at least one actuating unit of the main panel has a resilient member having a positioning point formed on a central part of the resilient member; and
   the first sliding unit has at least one positioning segment selectively engaging the positioning point of the resilient member of each one of the at least one actuating unit.

11. The dual directional sliding hinge as claimed in claim 10, wherein
   the positioning point of the resilient member is a protrusion; and
   the positioning segment of the first sliding unit is a recess.

12. The dual directional sliding hinge as claimed in claim 10, wherein
   the positioning point of the resilient member is a recess; and
   the positioning segment of the first sliding unit is a protrusion.

13. The dual directional sliding hinge as claimed in claim 5, wherein
   the linking part of the sliding frame has two hooking parts formed respectively on two side edges of the linking part and respectively engaging two side edges of the main panel;
   the receiving part of the sliding frame has two hooking parts formed respectively on two side edges of the receiving part and slidably clamping two side edges of the connecting frame.

14. The dual directional sliding hinge as claimed in claim 13 further comprising an auxiliary frame mounted securely around the main panel and has two auxiliary channels formed on two sides of the auxiliary frame and receiving the hooking parts of the linking part of the sliding frame.

15. A portable device with a dual directional sliding hinge as claimed in claim 1 comprising:
   a cover attached securely to the main panel of the sliding hinge and having a display panel mounted thereon;
   a first base attached securely to the first sliding unit and having a first functioning unit mounted thereon; and
   a second base attached securely to the second sliding unit and having a second functioning unit mounted thereon.

16. The portable device as claimed in claim 15, wherein
   the cover and the first base have the same area;
   the first functioning unit corresponds to the first direction;
   the first base has a mounting recess formed thereon and corresponding to the second direction; and
   the second base is mounted slidably on the mounting recess of the first base.

17. A dual directional hinge comprising:
   a main panel having a main channel formed therethrough;
   a first sliding unit mounted slidably on the main panel;
   a second sliding unit mounted slidably on the first sliding unit; and
   a connecting unit pivoting on the first sliding unit and having
      a first end connecting pivotally to the main channel; and
      a second end connecting pivotally to the second sliding unit,
   wherein when the first sliding unit slides relative to the main panel to a first direction, the connecting unit slides the second sliding unit to the first direction, and
   wherein when the first sliding unit slides relative to the main panel to an opposite second direction, the connecting unit slides the second sliding unit to the second direction.

18. The dual directional sliding hinge as claimed in claim 17, wherein the main channel has a first slot and a second slot connecting to each other and the first slot and the second slot includes an angle θ.

19. A portable device with a dual directional sliding hinge as claimed in claim 17 comprising:
   a cover attached securely to the main panel of the sliding hinge and having a display panel mounted thereon;
   a first base attached securely to the first sliding unit and having a first functioning unit mounted thereon; and
   a second base attached securely to the second sliding unit and having a second functioning unit mounted thereon.

20. The portable device as claimed in claim 19, wherein when the cover slides the first sliding unit to the second direction, the connecting unit slides the second functioning unit to reveal the second functioning unit relative to the cover.

* * * * *